United States Patent
Dorfman et al.

(10) Patent No.: US 7,155,336 B2
(45) Date of Patent: Dec. 26, 2006

(54) SYSTEM AND METHOD FOR AUTOMATICALLY COLLECTING IMAGES OF OBJECTS AT GEOGRAPHIC LOCATIONS AND DISPLAYING SAME IN ONLINE DIRECTORIES

(75) Inventors: Barnaby M. Dorfman, Palo Alto, CA (US); Udi Manber, Palo Alto, CA (US); Jonathan A. Gold, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 141 days.

(21) Appl. No.: 10/809,049

(22) Filed: Mar. 24, 2004

(65) Prior Publication Data

US 2005/0216193 A1    Sep. 29, 2005

(51) Int. Cl.
G01C 21/26    (2006.01)
(52) U.S. Cl. ............... 701/200; 701/208; 701/211; 725/51
(58) Field of Classification Search ........ 701/200–202, 701/207–209, 213–215, 25; 342/357.06, 342/357.08, 357.12; 340/988, 995.1
See application file for complete search history.

(56) References Cited

U.S. PATENT DOCUMENTS

| | | |
|---|---|---|
| 5,633,946 A | 5/1997 | Lachinski et al. |
| 6,363,161 B1 | 3/2002 | Laumeyer et al. |
| 6,449,384 B1 | 9/2002 | Laumeyer et al. |
| 6,625,315 B1 | 9/2003 | Laumeyer et al. |
| 6,810,323 B1 * | 10/2004 | Bullock et al. ............. 701/206 |

OTHER PUBLICATIONS

"iStreetView™ 360-Degree Geo-Coded Street Level Imaging on the Web," © @City , <http://www.atcity.com> [retrieved May 3, 2004].
Hinman, K., "From Chimney Pot to Loge, a Virtual Close-Up of Paris," The New York Times Company, Apr. 3, 2003, 2 pages.
"MDL:: Product Range—Surveying & GIS," <http://www.mdl.co.uk/product_range_surveying.htm> [retrieved Dec. 21, 2003].
"MDL:: Product Range—VideoAce," <http://www.mdl.co.uk/products_videoace.htm> [retrieved Dec. 21, 2003].
[Red Hen Web Pages], © 1994-2003 Red Hen Systems, Inc. , <http://www.redhensystems.com . . . >[retrieved Dec. 18, 2003].
"Trimble—Mapping & GIS," © 2003 Trimble Navigation Limited, <http://www.trimble.com/mappinggis.html> [retrieved Dec. 21, 2003].

* cited by examiner

*Primary Examiner*—Y. Beaulieu
(74) *Attorney, Agent, or Firm*—Christensen O'Connor Johnson Kindness PLLC

(57) ABSTRACT

A method and system are provided for collecting images of objects at geographic locations for publication in an online directory, such as online Yellow Pages. A camera and a GPS receiver, both receiving time information from a synchronized clock, are mounted on a vehicle. Time-stamped images captured by the camera and time-stamped geographic locations (e.g., longitude and latitude coordinates) determined by the GPS receiver are recorded. Each image is then associated with a geographic location based on corresponding respective time-stamps. Thereafter, each image is correlated with a street addresses based on each image's associated geographic location, for example by referring to a lookup table that correlates addresses with geographic coordinates. The address-correlated images may then be used in an online directory, where each listing (e.g., business) can be displayed with an image of an object (e.g., store front) taken at the address in the listing.

15 Claims, 6 Drawing Sheets

SYSTEM AND METHOD FOR AUTOMATICALLY COLLECTING IMAGES OF OBJECTS AT GEOGRAPHIC LOCATIONS AND DISPLAYING SAME IN ONLINE DIRECTORIES

FIELD OF THE INVENTION

The present invention is related to production of online directories and, more specifically, to online directories, such as Yellow Pages, at which a user can view images.

BACKGROUND OF THE INVENTION

Various online directories, such as online Yellow Pages, are available. Typically, when searching an online business directory, a user is prompted to enter selection criteria such as the general geographic location (e.g., state and city) and the type or category of business (e.g., restaurant) that the user is looking for, or perhaps the name of the business itself, if known. In response, listings for each of the businesses that meet the user's selection criteria are displayed. Each listing typically identifies the name, address, and phone number of the listed business. Further, each listing may be associated with icons that the user may click to obtain further information about the business, such as the map of an area around the business and driving directions to the business. Current online directories, however, do not provide listings that can be displayed with an image of the physical location of the business featured in the listing. While some aerial or rooftop images are available online in correlation with addresses, such aerial or rooftop views are of limited value because they do not show, for example, business buildings in the manner actually perceived by customers (i.e., at the ground level). More particularly, what is lacking is an automated system and method for collecting and displaying images of objects at geographic locations, such as business storefronts, in online directories.

SUMMARY OF THE INVENTION

The present invention provides methods and systems whereby online directories, such as online Yellow Pages, may feature listings with an associated actual image of the business taken by a camera. Thus, a user accessing an online Yellow Page directory prepared using the present invention can visually appreciate the business, i.e., its building, and also perhaps its surrounding area. From the businesses' point of view, an online Yellow Page directory that uses the present invention provides value-added media through which the businesses can visually appeal to their potential customers to hopefully attract more business.

According to one aspect, the present invention provides a method of automatically collecting images of objects at geographic locations for publication in an online directory. In one embodiment, an operator first mounts on a vehicle at least one camera (video or still) and a GPS receiver, each having access to a synchronized clock. Second, the operator drives the vehicle while capturing images with the camera and also recording geographic locations (e.g., longitude and latitude coordinates) as determined by the GPS receiver. Both the image data obtained by the camera and geographic location data obtained by the GPS receiver are time-stamped. Third, the object captured in each image is associated with a geographic location based on corresponding respective time-stamps of the image data and geographic location data. (Alternatively, a GPS receiver/camera combination system that automatically encodes the geographic location data obtained from the GPS receiver onto, for example, the audio track of a video tape may be used, to produce images each associated with a geographic location. It is noted that this embodiment eliminates the need to synchronize clocks.) Assuming that the location of the camera coincides with the location of the GPS receiver, and by offsetting the distance from the camera to the object (e.g., business building) being imaged, each image can be associated with the geographic location (e.g., longitude and latitude coordinates) of the object shown in the image. Fourth, each image is correlated with a street address based on each image's geographic location, for example by referring to a lookup table that correlates street addresses with geographic location. The address-correlated images may then be used in an online directory, where each listing (including an address) can be displayed together with a corresponding image taken by the camera at the address in the listing.

In further embodiments, multiple cameras may be mounted on the vehicle. For example, two cameras may be mounted facing two opposite directions, to simultaneously collect images on both sides of a street.

The offset distance between the location of the camera (and the GPS receiver) and the object being imaged by the camera can be preset, or may be measured by a range finder that is also mounted on the vehicle in a location coinciding with the camera and GPS receiver. The range finder may collect time-stamped distance information indicating the varying distance from the GPS receiver and camera to the object viewed by the range finder.

According to another aspect, the present invention provides a method of preparing images of objects at geographic locations for use in an online directory. Images of objects are received, in which each image is associated with a geographic location. Each image is then correlated with an address based on the image's then associated geographic location, for example, in reference to a lookup table that correlates addresses with geographic locations. The address-correlated images are provided for display with listings in an online directory based on the addresses in the listings. Specifically, an image can be published in the online directory such that the image is selected and displayed based on the address correlated with the image. A method of preparing images for use in an online directory may be provided in the form of computer-executable instructions stored on a computer-readable medium, that when read and executed by a computer processor, result in performing the steps of the method.

According to yet another aspect, the present invention provides a computer system for preparing images of objects at geographic locations for use in an online directory. One exemplary embodiment of the computer system includes a first component comprising an input/output interface for receiving images that are associated with geographic locations. A second component of the system is a memory with information that correlates addresses with geographic locations. A third component is a processor coupled to the input/output interface and the memory. The processor is configured to execute computer instructions that cause the processor to correlate each image received via the input/output interface with an address by referring to the information stored in the memory. The processor then provides each image for display with a listing in an online directory based on the address in the listing.

Once the address-correlated images are prepared, they are loaded to a server system in communication with a client system for supporting an online directory, wherein the address in each listing is correlated with an image of an object taken at the geographic location of the address. In one embodiment, the server system receives selection criteria for at least one listing from a client system. The server system displays on the client system at least one listing (e.g., business name, address, phone number, etc.) meeting the selection criteria. The server system then displays on the client system an image of an object taken at the address of the at least one listing meeting the selection criteria. An image may be automatically displayed together with the listing itself. In one embodiment, the user may also be permitted to request a zoom-in view, a zoom-out view, a scrolled-to-the right view, or a scrolled-to-the-left view of the displayed image, so as to appreciate, for example, the neighborhood view of the area surrounding the listing of interest. Also, the user may be further permitted to obtain a 360-degree view in some selected locations, such as at intersections, depending on images available in the system. For example, the user may be permitted to click and drag a cursor on the displayed image itself to shift the view point in any direction. Accordingly, an online directory using the present invention may permit the user to visually appreciate not only the images of various listings (e.g., businesses) but also the neighborhood surrounding these listings.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system and method for collecting images of objects (including, without limitation, buildings and store fronts) obtained at different geographic locations. The images may be displayed in association with corresponding listings in online directories. The following detailed description provides several exemplary implementations of the invention. Although specific system configurations and flow diagrams are illustrated, it should be understood that the examples provided are not exhaustive and do not limit the invention to the precise forms disclosed. Persons having ordinary skill in the field of digital data processing will recognize that the computer components and arrangements described herein may be interchangeable with other components and arrangements, and that the process steps described herein may be interchangeable with other steps or their combinations, and still achieve the benefits and advantages of the present invention.

It should also be noted that while the following description is provided in the context of an online business directory (e.g., Yellow Pages) at which each business listing is associated with an image of its geographic location, the present invention can be applied to create and publish online residential directories (e.g., White Pages) in which each individual listing is associated with an image of its geographic location (e.g., an image of a house). Therefore, the term "Yellow Pages" as used herein may refer to other types of directories as well, including White Pages.

Figure 1:
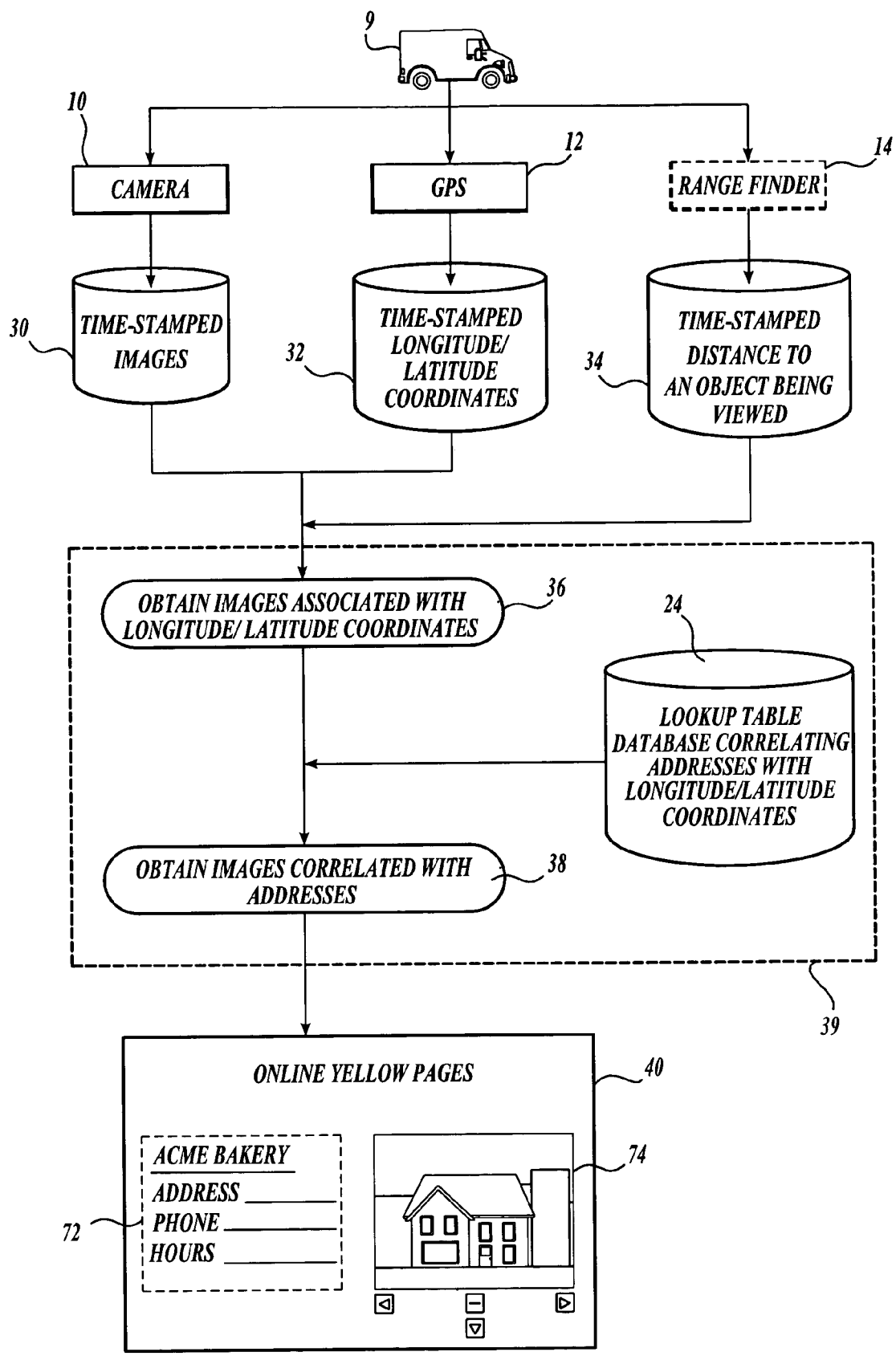
FIG. 1 is a pictorial flow diagram of one exemplary method for collecting address-correlated images of objects at geographic locations for publication in an online directory according to one embodiment of the present invention.

FIG. 1 illustrates an overall flow diagram of a method for collecting images of objects at geographic locations for publication in an online directory, at which each listing is associated with an image taken by a camera at the address in the listing. A system for collecting images (e.g., system 16 in FIG. 2) is mounted on a vehicle 9. The vehicle 9 may be an automobile, as illustrated, but may be of any other type apparent to one skilled in the art, such as a bicycle, bus, or airborne vehicle such as a manned or unmanned airplane. The image collection system, in this embodiment, includes at least one camera 10 and a GPS receiver 12. Optionally, a range finder 14 may also be included in the system and mounted on the vehicle 9.

Figure 2:
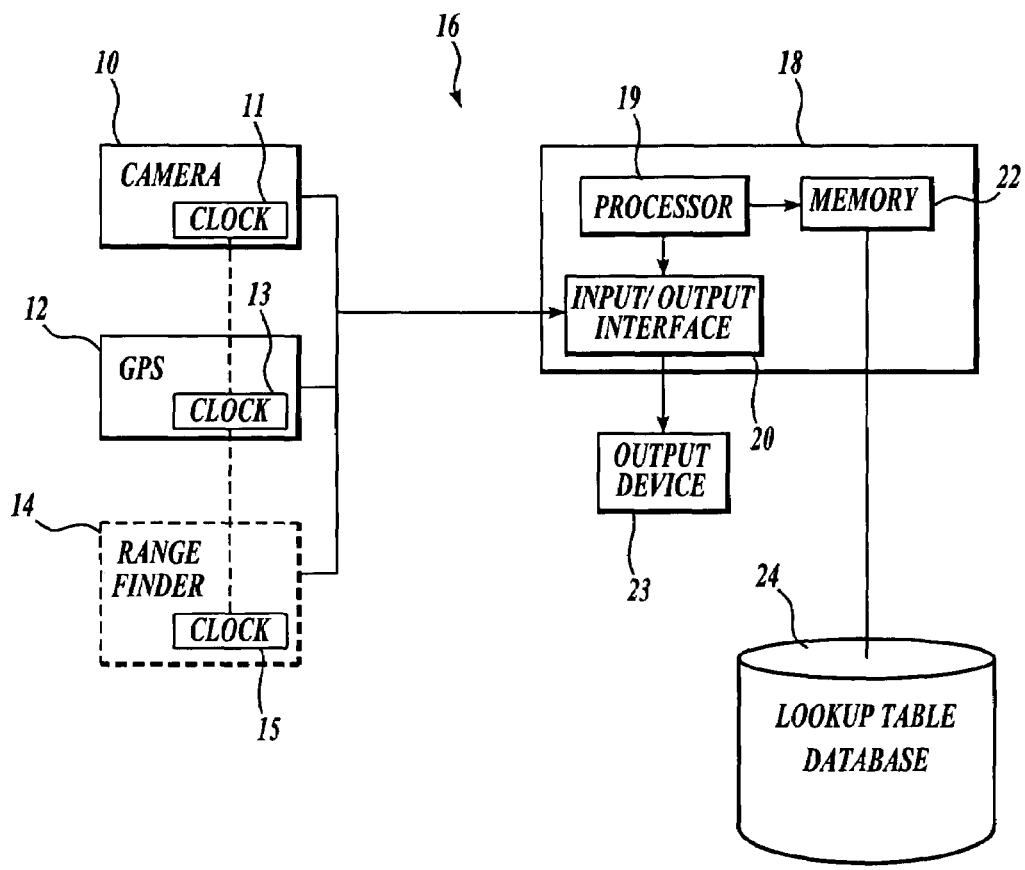
FIG. 2 is a functional block diagram of an exemplary system that may be used to collect images of objects at geographic locations.

FIG. 2 illustrates an embodiment of a system 16 suitable for collecting images of objects at geographic locations and correlating the images with street addresses for the geographic locations. The system 16 includes the camera 10, the GPS receiver 12, and perhaps the range finder 14, each including or having access to a synchronized clock 11, 13, and 15, respectively. The clocks 11, 13, and 15 may be separate clocks that are synchronized with each other, or alternatively a single clock that the camera 10, the GPS receiver 12, and the range finder 14 are all coupled to for time reference. A synchronized clock may thus mean one or more clocks, from which each of multiple devices can receive synchronized time information. The camera 10, the GPS receiver 12, and the range finder 14, if provided, are coupled to a computing device 18, such as a laptop computer. In some applications where the data storage capacity of the camera 10, the GPS receiver 12, and the range finder 14 is sufficiently large, the computing device 18 need not be coupled to the camera 10, the GPS receiver 12, and the range finder 14 during image collection (e.g., while mounted on the vehicle 9).

The computing device 18 includes a processor 19 in communication with an input/output interface 20 and a memory 22. The input/output interface 20 enables the computing device 18 to communicate with various input and output devices. Input devices may include the camera 10, the GPS receiver 12, and the range finder 14, as illustrated, plus any other computing elements that provide input signals to the computing device 18 such as a keyboard, mouse, external memory, disk drive, etc. Output devices 23 may include typical output devices, such as a computer display, printer, facsimile machine, copy machine, etc. The processor 19 is configured to operate in accordance with computer program instructions stored in a memory, such as the memory 22.

Program instructions may also be embodied in a hardware format, such as one or more programmed digital signal processors. The memory 22 may also be configured to store various data (e.g., image data and geographic location data) collected and processed, as will be more fully described below. In some applications, the data obtained by the camera 10, the GPS receiver 12, and the range finger 14 (if provided) are sent directly to a hard drive (forming part of the memory 22) of the computing device 18 for storage, instead of being first stored in video tapes or removable disks. The memory 22 may include, for example, a lookup table database 24 that stores address data in correlation with geographic locations (e.g., longitude and latitude coordinates). Suitable lookup table databases are routinely used for the purpose of creating maps and are commercially available. Those having ordinary skill in the art of computers will recognize that a wide selection of commercially-available components and arrangements can be used to construct a system such as the system 16 illustrated in FIG. 2. In particular, the computing device 18 may include additional conventional components, such as a network interface, which are not illustrated herein for the purpose of clarity.

Referring back to FIG. 1, once the camera 10, the GPS receiver 12, and perhaps the range finder 14 are mounted on the vehicle 9, an operator drives the vehicle while automatically, or perhaps manually (with the aid of another operator), capturing a series of images of objects (e.g., building or store fronts) each side of the street using the camera 10. In some applications, for example when the street width is sufficiently narrow or the street is relatively quiet, two cameras 10 may be mounted on the vehicle facing opposite directions so as to simultaneously take two series of images covering both sides of the street. In other applications, three or more cameras 10 may be mounted on the vehicle. For example, two or more cameras 10 may be mounted on the same side of the vehicle (for example, two on one side and two on the other side) to collectively obtain a stereoscopic image of each object being imaged. Any suitable auto-focus camera(s) 10 may be used, as will be apparent to one skilled in the art, though preferably the camera 10 would be a digital still camera or a digital video camera. If a digital still camera is used, the series of images taken will be still images. If a digital video camera is used, the series of images taken will be image frames that collectively form a video image. In any case, the camera 10 preferably time-stamps each image, i.e., records the time each image (or each image frame) is taken, in reference to a synchronized clock 11. Time-stamping is a standard feature of commercially available cameras.

As the camera 10 captures images of objects at geographic locations (e.g., businesses), the GPS receiver 12 records the geographic locations (e.g., longitude and latitude coordinates) while preferably time-stamping the recorded location data. The camera 10 and the GPS receiver 12 may be positioned or programmed relative to each other (e.g., by offsetting the distance therebetween) such that the geographic location determined by the GPS receiver 12 can be treated as that of the camera 10 itself. The range finder 14, if used, records the distance to an object being viewed by the range finder 14 while preferably time-stamping such distance information. The range finder 14 may also be positioned or programmed relative to the camera 10 and the GPS receiver 12 such that the distance information determined by the range finder 14 can be treated as that of the camera 10. Any suitable GPS receiver and range finder may be used, as will be apparent to one skilled in the art. For example, some high-precision GPS receivers suitable for use in the present invention are available from Trimble Navigation Ltd. of Sunnyvale, Calif. (www.trimble.com). A line of laser range finders suitable for use in the present invention are available from Measurement Devices Ltd. (MDL) of Scotland, U.K. (www.mdl.co.uk).

Figure 3:
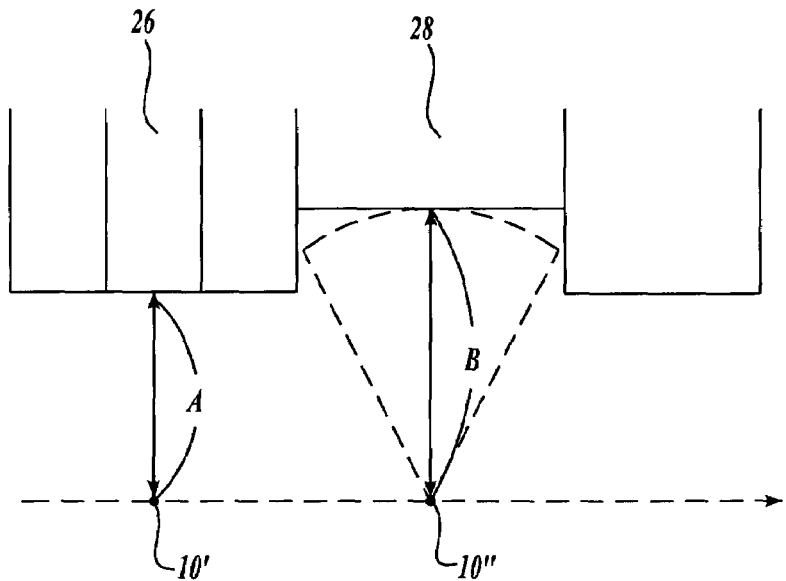
FIG. 3 is a schematic diagram illustrating distance offsetting between a camera and an object being imaged by the camera.

The range finder 14 is useful in offsetting the distance between the GPS receiver 12 (geographically coinciding with the camera 10 and the range finder 14) and the object being imaged by the camera 10, so as to more accurately determine the precise geographic location of the object being imaged. Specifically, referring to FIG. 3, when a camera 10 mounted on a vehicle is moved from position 10' to position 10" with the movement of the vehicle, the distance from the camera to the object being imaged changes from distance A (to building 26) to distance B (to building 28). If the distance from the camera 10 to the objects being imaged by the camera 10 is substantially constant, a standard offset (e.g., distance A) may be used to calculate the longitude/latitude coordinates of the objects being imaged. If, on the other hand, this distance varies substantially, or if it is preferred to precisely calculate the longitude/latitude coordinates of the objects being imaged, the range finder 14 may be used to continuously measure this distance. The direction of the field of view of the camera 10 may be determined by a compass (not shown) or based on the direction of the movement of the camera 10 carried by the vehicle (e.g., from position 10' to position 10" in FIG. 3) as determined by the GPS receiver 12. An angle of the camera 10 relative to the moving direction of the vehicle is known, and may be used to further determine the direction of the camera 10 relative to the objects being imaged.

Sometimes the vehicle 9 must travel on inclines. Since buildings are built perpendicularly to the earth, with the camera 10 being mounted level to the vehicle 9, the images captured by the camera 10 appear tilted. To overcome this problem, a gyroscope can be used with the camera 10 mounted on a gimbal. A suitable gyroscope-based mounting system (or a stabilizer) can be obtained from Kenyon Laboratories, L.L.C. of Essex, Conn. (www.ken-lab.com). Another approach for solving this problem is to use a digital inclinometer to track an angle of the camera 10 relative to a level, and then rotate the images in software during post-capture processing to compensate for the measured tilt-angles.

To collect images and geographic locations of numerous businesses, many vehicles may be used, each equipped with a camera and a GPS receiver. In order to efficiently collect images and geographic location data of businesses in remote or isolated areas, certain utility vehicles, such as U.S. Postal Service delivery vehicles or taxi cabs, may be requested to carry a data collection system of the present invention.

Referring back to FIG. 1, the camera 10 therefore produces a set of time-stamped image data 30, the GPS receiver 12 produces a set of time-stamped geographic location data 32 (e.g., longitude and latitude coordinates), and the range finder 14 produces a set of time-stamped distance information data 34. These sets of data may be downloaded to the computing device 18 (see FIG. 2) and associated with each other based on their respective time-stamps so as to associate each image with a geographic location of the object featured in the image, as indicated at block 36 in FIG. 1. The data download to the computing device 18 may occur continuously (e.g., at the same time as the data are collected by the camera 10, the GPS receiver 12, and the range finder 14) or in batches (e.g., after a certain volume of data are collected by the camera 10, the GPS receiver 12, and the range finder 14).

Alternative methods of associating image data with geographic locations are encompassed by the invention. For example, instead of relying on synchronization of the clocks 11, 13, and 15 of the respective devices, the devices may be coupled to each other so that, for example, image taking of the camera 10 instantaneously triggers the GPS receiver 12 and the range finder 14 to record the geographic location and the distance information at that location, and the data are recorded together as a unit. Alternatively, geographic location recording of the GPS receiver 12 (or another controller triggered by the geographic location recording of the GPS receiver 12) triggers the camera 10 to take an image. For example, the longitude/latitude coordinates of selected businesses whose images are to be taken (available from the lookup table database 24) may be input to the GPS receiver 12 coupled to the camera 10. Each time the GPS receiver 12 determines it is located in front of a selected business, the GPS receiver 12 records the geographic location and triggers the camera 10 to record an image of the business. In this way, only those images capturing listed business addresses will be taken. The foregoing description is not exhaustive, and other methods for associating images with geographic locations may be used, as will be apparent to one skilled in the art.

While components of the system 16, such as the camera 10, the GPS receiver 12, the range finder 14, and the computing device 18, may be individually configured and assembled as described above, alternative systems may employ various commercially-available geographic information systems (GIS) that are typically used for surveying and mapping. Typically, a geographic information system is a combination of elements (including both hardware and software) designed to collect, manipulate, store, and display geographic data. For example, Red Hen Systems, Inc., of Fort Collins, Colo. (www.redhensystems.com), offers add-on GPS receivers sold under the trademark of VMS 200™ and VMS Mobile™, that can be used with an off-the-shelf digital video camera to embed GPS data on the video recording. Similarly, Measurement Devices Ltd. (MDL) of Scotland, U.K. (www.mdl.co.uk), offers an add-on GPS module sold under the trademark of VideoAce®, that can be combined with any video camera to collect video still images and movies that are referenced with GPS data. Using these devices, one can readily collect a series of images that are referenced with their geographic locations (longitude and latitude coordinates). Note that use of these systems combining the GPS receiver and the camera eliminates the need to synchronize clocks in various components (the camera 10, the GPS receiver 12, etc.).

According to one aspect of the present invention, only a subset of the entire set of obtained images (video image frames, or still images) may be selected and used so as to minimize both gaps and overlaps. For example, when a video camera is set to take 30 frames per second, only frames every X feet (depending on the rate of travel of the video camera) are selected to minimize both frame gaps and frame overlaps.

Sometimes, signals from the GPS satellites may become too weak to permit the GPS receiver 12 to calculate its geographic location. For example, the GPS receiver 12 may not function well when it is placed without a clear view of a wide sky (e.g., in cities with tall buildings, under trees with a thick canopy, etc.). Also, there may be limitations on the logging rate of the GPS receiver 12 (e.g., most GPS receivers currently permit only one geographic location recordation per second). In accordance with the present invention, interpolation of the geographic location information is used to overcome the GPS signal loss issues and/or the limitations on the GPS logging rate. Specifically, using any two geographic locations recorded by the GPS with time-stamps ("logged locations"), the rate of travel and also the direction of travel can be calculated. Then, the geographic location (e.g., longitude and latitude coordinates) of any point between the two logged locations can be calculated using interpolation based on the rate of travel and the direction of travel. Additionally, the logged locations can be overlaid onto existing maps showing streets, which define feasible regions (routes) of image capture along which the vehicle 9 carrying the camera 10 could have passed. In other words, the streets indicate feasible (valid) paths along which the geographic locations calculated based on interpolation can fall. For example, if a map shows a building, any interpolated geographic location (between two logged locations) that falls "inside" the building is invalid as showing the possible location of the camera 10 because the vehicle 9 carrying the camera 10 could not have driven "through" the building. Therefore, by overlaying the logged locations to existing maps of streets, which provide feasible regions to verify the validity of any geographic location calculated based on interpolation, one can reduce or eliminate interpolation errors. Accordingly, using the interpolation method, perhaps as assisted by the map-overlaying method, a geographic location of any image can be calculated even when such a geographic location cannot be directly obtained using the GPS receiver 12.

In some cases, it is preferable to use a GPS receiver having a relatively higher refresh rate so as to reduce the need for interpolation. For example, while most commercially available GPS receivers currently permit only one geographic location recordation per second, a GPS receiver and its associated software may be configured to obtain more than one geographic location recordation per second.

Next, as indicated in block 38 of FIG. 1, the computing device 18 correlates each image (already associated with a geographic location) with an address by referring to a lookup table database 24 that stores addresses in correlation with their longitude and latitude coordinates. Alternatively, a suitable algorithm for deriving an address based on a geographic location (e.g., longitude and latitude coordinates) may be used, such as the algorithm supported by "Geocoding Server" available from Mapquest™. Such an algorithm uses a series of logics to estimate an address based on longitude/latitude coordinates, such as a block numbering system, a position within a sequence of addresses on a block (e.g., 1002 is the second of 10 addresses on a block so it is likely to be at 20% of the block distance from the corner), and the odd/even numbering system to indicate a particular side of each street. Further details regarding the process 39 (comprising steps 36 and 38 of FIG. 1) for manipulating data collected by the camera 10, the GPS receiver 12, and the range finder 14 are provided in reference to FIG. 4.

After the series of images are correlated with addresses in block 38, the address-correlated images may be used in publishing an online directory 40 at which each listing 72 can be displayed together with an actual image 74 of the address in the listing. The publication and operation of an online directory will be more fully described in reference to FIGS. 5 and 6A–6E.

Figure 4:
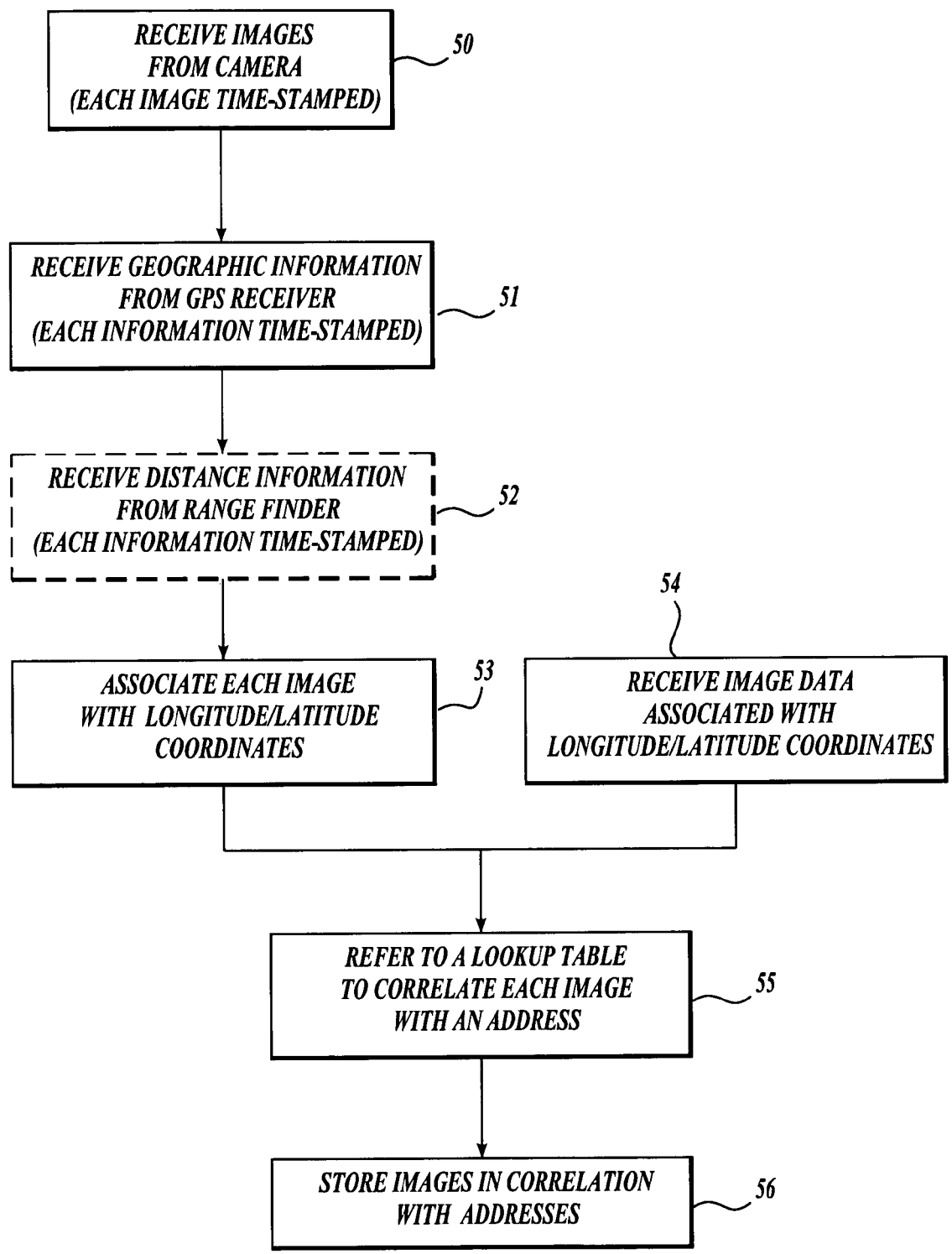
FIG. 4 is a flow diagram of one exemplary method for preparing images of objects collected at geographic locations for publication in an online directory according to one embodiment of the present invention.

Referring now to FIG. 4, a method of manipulating the data collected by the camera 10, the GPS receiver 12, and the range finder 14, for producing address-correlated image data is described. In block 50, images of objects (e.g., business structures) taken by the camera 10 are received wherein each image is time-stamped. In block 51, a series of geographic locations (longitude and latitude coordinates) that are also time-stamped are received from the GPS receiver 12. In block 52, if the range finder 14 is used, a series of time-stamped distance information obtained by the range finder 14 is received. In block 53, the image data, the longitude and latitude coordinate data, and the distance information (if obtained), are all associated with each other based on their respective time-stamps, to thereby associate each image with the particular latitude/longitude coordinates of the object featured in the image. As described above, only a subset of the entire set of images may be selected and used to minimize gaps and overlaps. Also as described above, when the geographic locations of certain images cannot be obtained directly from the GPS receiver 12, those locations can be calculated based on interpolation. Thereafter, in block 55, each image is correlated with an address, for example, in reference to the lookup table 24 (FIG. 1). Address correlation may be accomplished in any suitable manner, such as by assigning a corresponding address to each image, or by assigning a common identification number to each image and its address. In block 56, each image is stored in correlation with its address. Note that, if a specialty mapping/surveying device that produces image data already embedded with GPS data is used, as described above, then blocks 50–53 described above may be replaced with a single block 54 at which such GPS data-referenced image data is received. As before, at this time, only a subset of the entire set of images (or image frames) captured by the camera 10 may be selectively received to minimize gaps and overlaps, and also, any geographic locations not directly obtainable from the GPS receiver 12 may be calculated based on interpolation. Thereafter, as before, the images are correlated in block 55 with addresses in reference to the lookup table 24, and the address-correlated images are stored in block 56.

Figure 5:
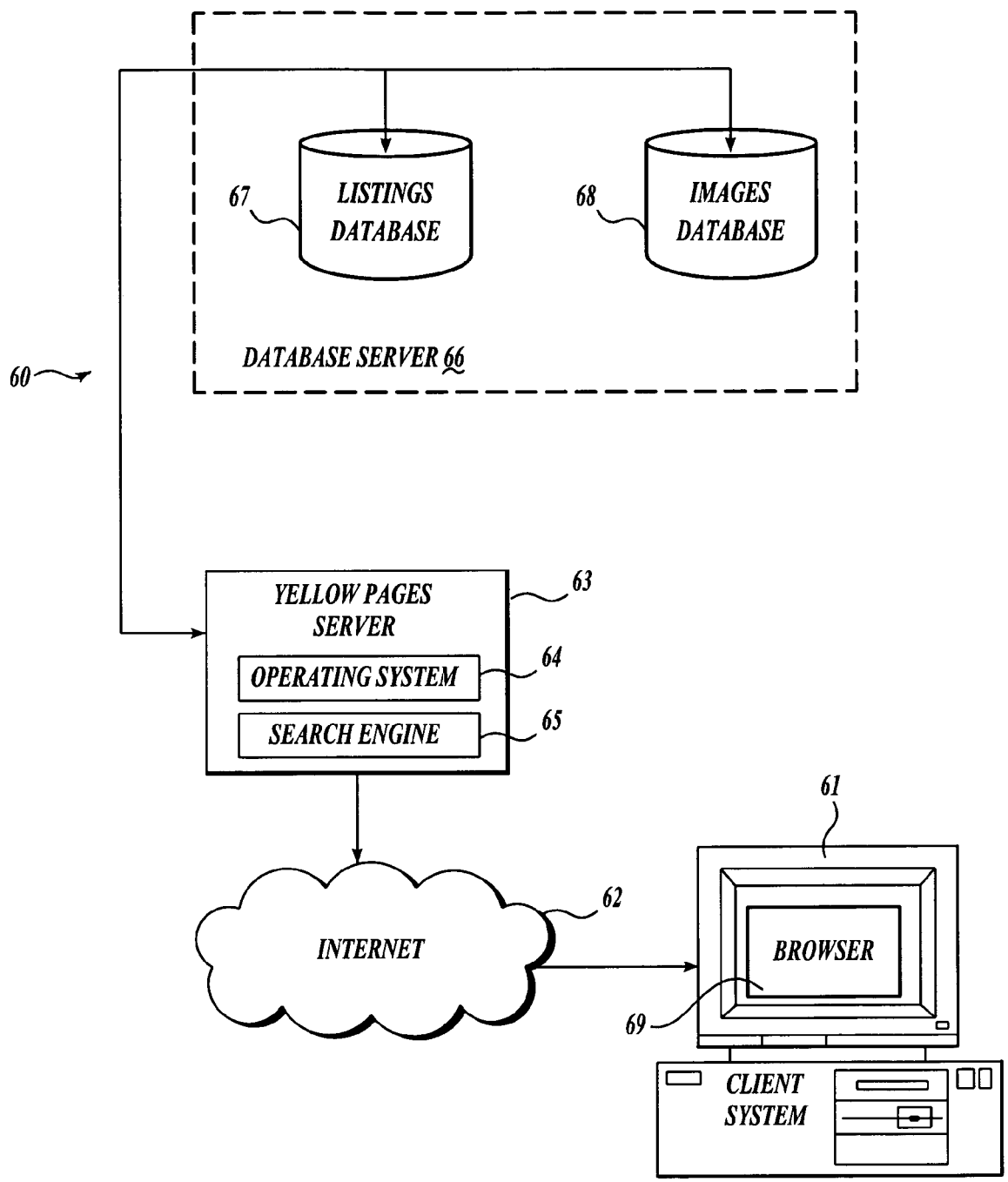
FIG. 5 is a block diagram showing an environment and arrangement of certain computing components for implementing an online directory according to one embodiment of the present invention.

Address-correlated images may be published in an online directory in accordance with the present invention. FIG. 5 illustrates one environment for implementing an online Yellow Pages that includes a Yellow Pages system 60 and one or more client systems 61 (only one is shown), such as personal computers and PDAs, that individual users can use to communicate with the Yellow Pages system 60. In the environment shown in FIG. 5, the client systems 61 communicate with the Yellow Pages system 60 via wired or wireless connections to one or more computer networks, such as the Internet 62. Protocols and components for communicating via the Internet are well known to those of ordinary skill in the art of computer network communications. The client system 61 requests and retrieves information from the Yellow Pages system 60 via a Web browser application 69 that provides the user with a graphical user interface to the Internet, as is also well known to those of ordinary skill in the art.

The Yellow Pages system 60 depicted in FIG. 5 operates in a distributed computing environment comprising several computer systems that are interconnected via communication links, e.g., using one or more computer networks or direct connections. However, it will be appreciated by those of ordinary skill in the art that the system 60 could equally operate in a computer system having fewer or greater number of components than are illustrated in FIG. 5. Thus, the description of the Yellow Pages system 60 in FIG. 5 should be taken as exemplary, and not limiting to the scope of the invention. In particular, the Yellow Pages system 60 may comprise plural subsystems, each for performing a specific function in response to a request from a client system, as will be more fully described below in reference to FIGS. 6A–6E.

The Yellow Pages system 60 as illustrated includes both a Yellow Pages server 63 having an operating system 64, and a search engine 65, and a database server 66 having a listings database 67 and an images database 68. The Yellow Pages server 63, in this example, is a Web page server that supports an online Yellow Pages Web site, at which each listing (e.g., business) can be displayed together with an image. The Yellow Pages server 63 communicates text and graphics organized as a Web page using, for example, hypertext transfer protocols, in response to requests and search queries received from the client systems 61. The Yellow Pages server 63 also conducts searches of the databases 67 and 68 in the database server 66. The administration and overall operation of the Yellow Pages server 63 is controlled by its operating system 64, while its search function is performed by the search engine 65 in cooperation with the database server 66.

The database server 66 maintains the listings database 67 and the images database 68 that the Yellow Pages server 63 uses to respond to user requests and search queries. The listings database 67 contains information generally found in conventional Yellow Pages in a searchable form, i.e., numerous listings (business names together with their addresses, phone numbers, etc.) searchable by their business names, addresses, phone numbers, business types, etc. The listings database 67 may also contain information such as the business hours, a brief description or profile, customer reviews, etc., of each business listed. The images database 68 contains digitized images of the businesses in correlation with the business addresses stored in the listings database 67. The database server 66 is configured to receive search instructions from the search engine 65 and return search results from the listings database 67 and the images database 68. Those of ordinary skill in the art will recognize that the Yellow Pages server 63 and the database server 66 will each typically employ a memory and main processor in which program instructions are stored and executed for operation of the servers.

The Yellow Pages system 60 enables a user to search and view online Yellow Pages, in which each listing (e.g., business), is displayed with an image of an object (e.g., business building) taken at the geographic location of the business. FIGS. 6A–6E illustrate sample Web pages that can be displayed on the client system 61 in response to user requests and search queries.

Figure 6A:
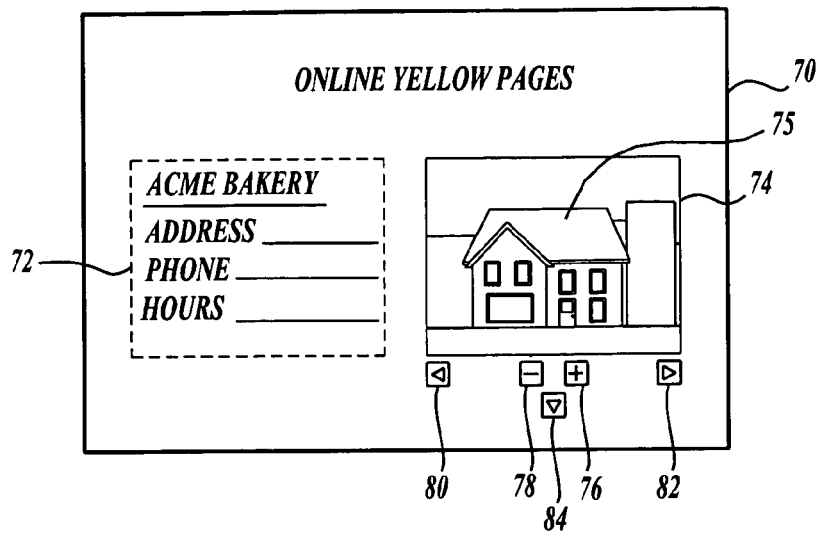
FIGS. 6A–6E depict exemplary Web pages received from a directory server and displayed on a client system, illustrating sample operations of an online directory in accordance with the present invention.

FIG. 6A illustrates a sample Web page 70 returned to a client system 61 when the user requests to view the listings for "bakery" in certain geographic limitations (state, city, etc.). The Web page 70 displays the listing 72 of "ACME Bakery," which meets the user's search criteria. The listing 72 includes the name of the business, the address and phone number of the business. Additionally, an image 74 of the business previously taken and correlated with the address in the listing (i.e., an image of the actual building of "ACME Bakery" 75 in this case) is displayed. While the image 74 is automatically displayed together with the display of the listing 72 in this example, it is possible to first display only the listing 72 with a "view image" icon (not shown), and then display the image 74 only upon the user's selection (e.g., clicking) of the "view image" icon. The Web page 70 further displays a "zoom in" icon 76, a "zoom out" icon 78, a "scroll to the left" icon 80, a "scroll to the right" icon 82, and a "what's on the other side of the street" icon 84, any of which can be selected by the user to request a specific operation through the browser application 69 of the client system 61, as will be described with specific examples below. It should be understood that the indicia of these icons are not limited to those illustrated in FIG. 6A. For example, the "zoom in" and "zoom out" icons may display the actual text "zoom in" and "zoom out," as opposed to the plus and minus signs shown in FIG. 6A.

Figure 6B:
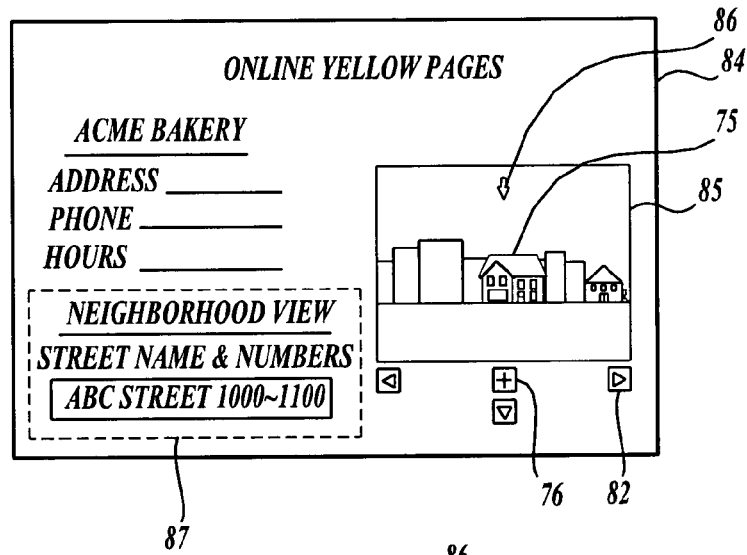

FIG. 6B illustrates a sample Web page 84 created in response to the user's selection of the "zoom out" icon 78 in FIG. 6A, showing a zoomed-out image 85 of "ACME Bakery" 75. Specifically, a wider range of street addresses surrounding (perhaps centering on) the address of "ACME Bakery" is specified according to a predefined program instruction (by the Yellow Pages server 63 of FIG. 5, for example), and the image (or images) corresponding to the specified range of street addresses is retrieved and displayed. An arrow 86 may be displayed to indicate where "ACME Bakery" 75 is in this zoomed-out view. If the image 85 cannot be further zoomed-out, the zoom-out icon 78 need not be displayed and only the zoom-in icon 76 may be displayed at this time. The zoomed-out image 85 is helpful for the user to appreciate the overall neighborhood view surrounding "ACME Bakery." Referring to a box 87, the neighborhood information, for example, the range of street numbers included in the image 85, can be displayed.

Figure 6C:
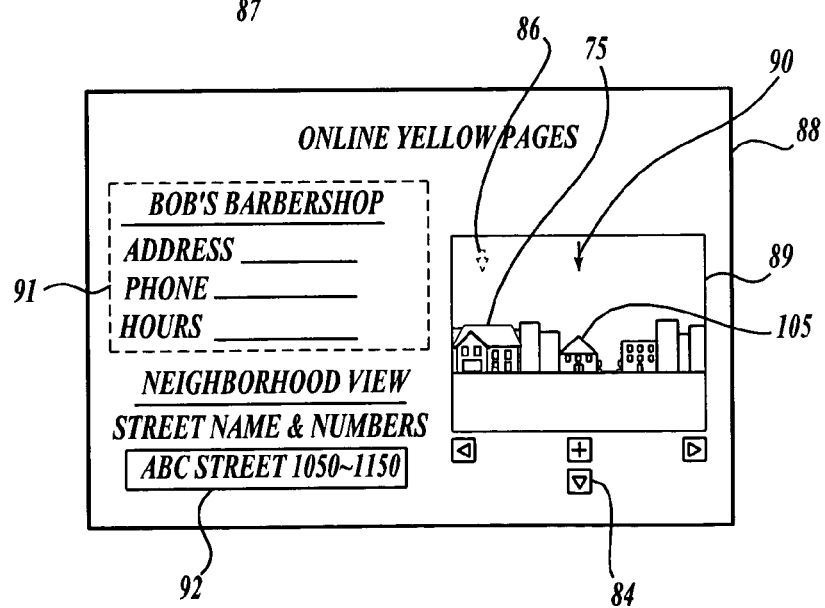

FIG. 6C illustrates a sample Web page 88 created in response to the user's selection of the "scroll to the right" icon 82 in FIG. 6B, showing an image 89 of the neighborhood still including "ACME Bakery" 75 but as shifted to the right (thus showing "ACME Bakery" 75 at the left of the screen). The range of street addresses shown previously in FIG. 6B may be shifted to the right by a specific amount according to a predefined program instruction, and the image (or images) corresponding to the shifted range of street addresses is retrieved and displayed. The arrow 86 may continue to be displayed to indicate where "ACME Bakery" 75 is in this scrolled-to-the-right view. The scroll-to-the-right feature may be limited so that the business of initial interest, "ACME Bakery" 75 in this example, will not disappear from the view. Alternatively, the scroll-to-the-right feature (or the scroll-to-the left feature) may be unlimited and may continue to function as long as the addresses (and the images) are available to the right or left of the image currently shown.

Alternatively or additionally, a second arrow 90 may be displayed to point to the address (business) at the center of the displayed image 89 ("Bob's Barbershop" 105 in the illustrated example). In this embodiment, the listing information (the business name, address, phone number, business hours, etc.) of the business that the second arrow 90 points to may be displayed, as in box 91. Thus, as the user scrolls the view to the right (or to the left), the listing information of a different business (as centered in the image) is sequentially displayed so that the user can appreciate what types of businesses are located along the street. Also, as the user scrolls the view to the right (or to the left), the street number range displayed in box 92 is updated to reflect what numbers are shown in the image at any given time. For example, FIG. 6B showed an image of "ABC Street 1000–1100" (box 87), while FIG. 6C shows an image of "ABC Street 1050–1150" (box 92), indicating that the image in FIG. 6C has been shifted by 50 street numbers to the right from FIG. 6B.

Figure 6D:
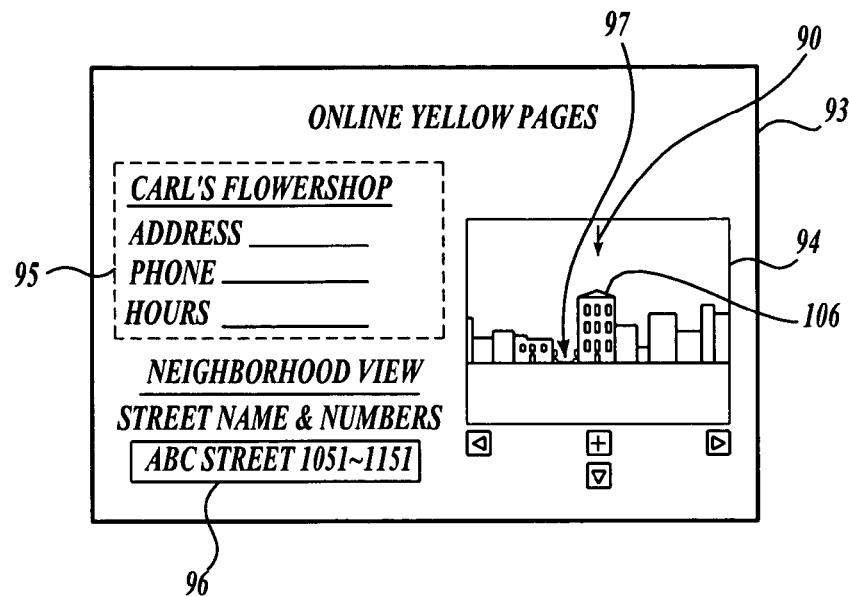

FIG. 6D illustrates a sample Web page 93 created in response to the user's selection of the "what's on the other side of the street" icon 84 in FIG. 6C, showing an image 94 of the neighborhood (at the same scale) that is on the other side of the same street as shown in FIG. 6C. Specifically, a range of street addresses that are on the other side of the same street as shown in FIG. 6C is identified according to a predefined program instruction, and the image (or images) corresponding to the new range of street addresses is retrieved and displayed. The second arrow 90 points to a business located at the center of the image (i.e., directly across the street from "Bob's Barbershop" 105 in FIG. 6C), which is "Carl's Flower Shop" 106, as listed in box 95. As before, the range of street numbers included in the image may be displayed, as in box 96. In the illustrated example, FIG. 6C showed an image of "ABC Street 1050–1150" (even numbers, in box 92), while FIG. 6D shows an image of "ABC Street 1051–1151" (odd numbers, in box 96). The "what's on the other side of the street" feature permits the user to appreciate the neighborhood view along either side of the same street. As in FIG. 6C, when the user scrolls the image 94 of FIG. 6D to the right or to the left, the listing information in the box 95 can be changed to refer to the business presently centered in the image 94 (and pointed to by the second arrow 90).

In FIG. 6D, note that a street 97 extends perpendicular to "ABC Street" (i.e., into the plane of FIG. 6D), indicating the existence of an intersection. Especially at an intersection, the user may wish to obtain a 360-degree view to appreciate the overall atmosphere of the location. Thus, in addition to the images of individual businesses as described above, 360-degree views of selected locations such as intersections may be obtained and correlated with their addresses (e.g., ABC Street and XYZ Boulevard), and stored in the database server 66.

Figure 6E:
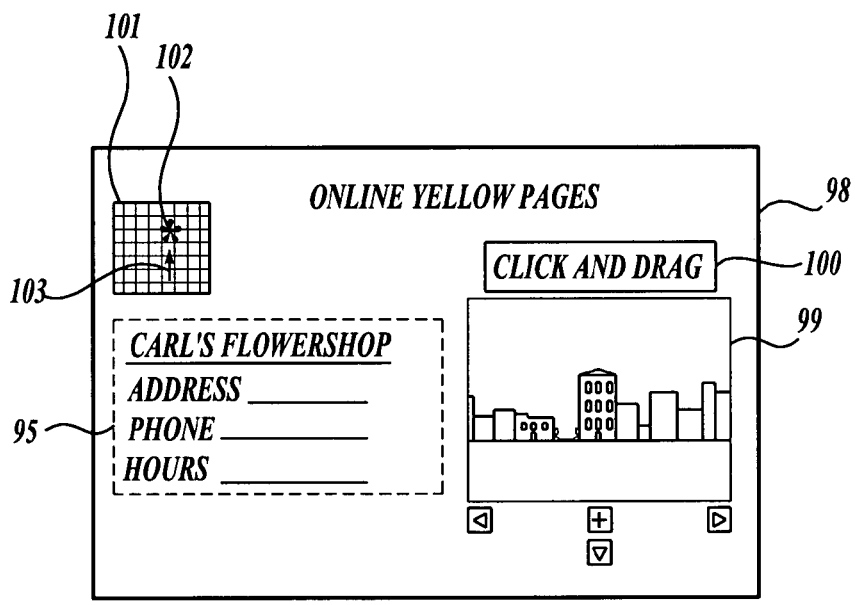

FIG. 6E illustrates a sample Web page 98 suitable for permitting the user to manipulate the view, for example to obtain a 360-degree view of a selected location. Specifically, when a 360-degree view is available, a "Click and Drag" icon 100 may appear to prompt the user to click and drag a cursor on the image 99 itself in the direction in which the user wishes to see a further view. For example, if the user clicks and drags a cursor on the image 99 continuously to the right, then the point of view continuously moves to the right until a complete 360-degree view is obtained. Alternatively or additionally, clicking and dragging a cursor along a street may shift the point of view along the street to obtain a view as if the user is walking along the street. (Similar to using the "scroll to the right" or "scroll to the left" features, described above.) Specific implementations of a click-and-drag feature are known in the art of virtual reality computing, and need not be described in detail herein. To assist the user in orienting where the user is, a map 101 surrounding the user's current cursor location 102 on the image 99 may be displayed, together with the direction in which the user's view is facing (in the form of an arrow 103). Still alternatively, it is contemplated that the user may click on the map 101 to request and display a neighborhood view of the location clicked, depending on images available in the database server 66.

It is emphasized that FIGS. 6A–6E, as described above, are merely sample Web pages that may be created by the operation of an online Yellow Page directory in accordance with the present invention, and do not limit the invention to the precise forms disclosed.

While it has been described that address-correlated images are initially stored and retrieved based on a user's inquiry, it is possible to store images in association with geographic locations only, and then correlate an address entered or requested by a user with a particular image later, for example on-the-fly at the time the user specifies an address.

In one embodiment of the present invention, suitable images for various addresses may be ultimately selected by users of the online directories. For example, image maps including plural images ("candidate" images) are presented to the users. (E.g., when a user requests to view a business having a particular address and hence a geographic location, plural candidate images all corresponding to the geographic location are presented.) The users are then asked to click on the business (e.g., storefront) if they see it in the image(s). By averaging the clicked-on coordinates across a number of user inputs, the location of the business within the image(s) can be calculated, and the image most prominently presenting the business (e.g., the one in which the business is centered) is selected and correlated with the address of the business. Similarly, one or more images presumably showing the address are presented to the users with a question "Is this image useful?". If the user's answer is positive, the image is correlated with the address, while if the answer is negative, the image is not correlated with the address. This method is effective in identifying and discarding images which, although showing the right addresses, may be of poor quality (e.g., images with bad lighting, blurring, in which a bird is flying in front of the camera, etc.).

While various embodiments of the invention have been illustrated and described, it will be appreciated that changes can be made therein without departing from the spirit and scope of the invention. The scope of the invention should be determined from the following claims and equivalents thereto.

The embodiments of the invention in which an exclusive property or privilege is claimed are defined as follows:

1. A method of preparing images of objects at geographic locations for use in an online directory, comprising:
   (a) receiving images of objects, wherein each image is associated with a geographic location;
   (b) automatically correlating each image with a street address based on each image's associated geographic location, wherein one or more images are correlated with each street address; and
   (c) providing an image for display with a listing in an online directory based on a street address in the listing.

2. The method of claim 1, wherein automatically correlating each image with a street address comprises using an algorithm comprising a series of logics to calculate street addresses based on geographic locations.

3. The method of claim 1, wherein automatically correlating each image with a street address comprises using the image's geographic location to refer to a lookup table that correlates street addresses with geographic locations.

4. The method of claim 1, wherein receiving images of objects further comprises:
   (i) receiving time-stamped images captured by a camera;
   (ii) receiving time-stamped geographic locations as determined by a GPS receiver that is located with the camera; and
   (iii) automatically associating each image with a geographic location based on corresponding respective time-stamps.

5. The method of claim 4, further comprising receiving time-stamped distance information as determined by a range finder located with the camera and GPS receiver for measuring a distance to an object being imaged by the camera, wherein the received distance information is used in automatically associating each image with a geographic location.

6. The method of claim 4, wherein the time-stamped images are captured using a digital video camera.

7. The method of claim 4, wherein the time-stamped images are captured using a digital still camera.

8. A computer-readable medium having computer-readable instructions that, when executed by a processor, result in performing the method of claim 1.

9. The method of claim 1, further comprising receiving an image of an object not associated with a geographic location and calculating the geographic location of the image based on interpolation.

10. The method of claim 1, wherein receiving images of objects comprises selectively receiving only a subset of an entire set of images captured by a camera so as to minimize gaps and overlaps.

11. A computer system for preparing images of objects at geographic locations for use in an online directory, comprising:
   (a) an input/output interface that receives images, each image being associated with a geographic location;
   (b) a memory with information that correlates street addresses with geographic locations; and
   (c) a processor coupled to the input/output interface and the memory, the processor being configured to execute computer instructions that cause the processor to:
      (i) correlate each image received via the input/output interface with a street address by referring to the information stored in the memory, wherein one or more images are correlated with each street address; and
      (ii) provide each image for display with a listing in an online directory based on a street address in the listing.

12. The computer system of claim 11, wherein the information in the memory comprises an algorithm comprising a series of logics to calculate street addresses based on geographic locations.

13. The computer system of claim 11, wherein the information in the memory comprises a lookup table that correlates street addresses with geographic locations.

14. The computer system of claim 11, wherein the input/output interface further receives some images not associated with geographic locations, and the processor is configured to calculate the geographic locations of those images based on interpolation.

15. The computer system of claim 11, wherein the input/output interface selectively receives only a subset of an entire set of images captured by a camera so as to minimize gaps and overlaps.

* * * * *